United States Patent
Quan et al.

(10) Patent No.: US 7,545,421 B2
(45) Date of Patent: Jun. 9, 2009

(54) APPARATUS, SYSTEM, AND METHOD FOR OPTIMIZING GAMMA CURVES FOR DIGITAL IMAGE DEVICES

(75) Inventors: Shuxue Quan, San Diego, CA (US); Andrew Chinchuan Chiu, San Diego, CA (US); Xiaoyun Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 674 days.

(21) Appl. No.: 11/146,484

(22) Filed: Jun. 6, 2005

(65) Prior Publication Data

US 2006/0092441 A1    May 4, 2006

Related U.S. Application Data

(60) Provisional application No. 60/623,445, filed on Oct. 28, 2004.

(51) Int. Cl.
  *H04N 5/202*    (2006.01)
  *H04N 17/00*    (2006.01)
  *H04N 17/02*    (2006.01)
(52) U.S. Cl. .................... 348/254; 348/188; 358/519
(58) Field of Classification Search ............. 348/175, 348/176, 180, 187–189, 222.1, 223.1, 254–257; 358/519, 1.1, 1.9; 382/162–167, 254; 702/88; 345/589
See application file for complete search history.

(56) References Cited

U.S. PATENT DOCUMENTS 6,078,686 A * 6/2000 Kim ............................. 382/167
6,320,668 B1 * 11/2001 Kim ............................. 358/1.1
7,084,881 B1 * 8/2006 Chen et al. .................... 345/589
2003/0184659 A1 * 10/2003 Skow ......................... 348/223.1
2003/0194128 A1 * 10/2003 Tan et al. ...................... 382/167
2004/0130638 A1 * 7/2004 Sakamoto .................... 348/254
2004/0199346 A1 * 10/2004 Stokes .......................... 702/88
2007/0076103 A1 * 4/2007 Tamaru et al. .............. 348/254

FOREIGN PATENT DOCUMENTS

EP    1292113    8/2002
EP    1420385    11/2003

* cited by examiner

*Primary Examiner*—Tuan V Ho
*Assistant Examiner*—Dennis Hogue
(74) *Attorney, Agent, or Firm*—George C. Pappas; Espartaco Diaz Hidalgo

(57) ABSTRACT

An apparatus, system, and method provide optimization of color space conversion using a joint quality metric representing differences between reference human visual representations and converted device captured image representations in a perceptual uniform color space, where the conversion includes transforming a nonstandard color space (RGB) to a perceptual standard color space (sRGB) and where the joint quality metric includes a color portion, a noise portion, and a contrast portion. An optical sensor produces a digital reference signal when capturing an image of a reference source such as a Macbeth ColorChecker color rendition chart. After white balancing and color correcting the digital reference signal, the gamma curve parameters are determined by minimizing the joint quality metric which is based on differences, within a uniform perceptual color space such as CIELAB, between the gamma curve compensated signal and the standard values for the reference source. The noise portion and contrast portion take into account the noise and the contrast of the gamma curve compensated signal resulting in a gamma curve parameter that is optimized with respect to color, noise, and contrast.

24 Claims, 2 Drawing Sheets

APPARATUS, SYSTEM, AND METHOD FOR OPTIMIZING GAMMA CURVES FOR DIGITAL IMAGE DEVICES

CLAIM OF PRIORITY UNDER 35 U.S.C. §119

The present Application for Patent claims priority to Provisional Application No. 60/623,445 entitled "A System and Method for Comprehensive Gamma Curve Optimization in a Digital Imaging Device," filed Oct. 28, 2004, and assigned to the assignee hereof and hereby expressly incorporated by reference herein.

BACKGROUND OF THE INVENTION

The invention relates in general to digital image devices and more specifically to an apparatus, system and method for optimization of gamma curves for digital image devices.

Digital image devices capture digital images by converting a received light image into a digital image and include digital optical sensors that convert the incoming light into digital signals. The digital signals can be stored and transmitted and allow the captured digital image to be displayed on a visual output device such as a Cathode Ray Tube (CRT) or Liquid Crystal Display (LCD). Color representations within the digital signals are typically represented as a vector coordinates in a three-dimensional color space. A common color space is the RGB color space that allows colors to be specified using coordinates that represent intensities of red, green, and blue light. Visual output devices reproduce color images in accordance with the signals representing vector coordinates as applied to the particular device output characteristic profile. Accordingly, different visual output devices may display the same color values as different colors. Due to differing image capturing characteristics of digital optical sensors, optical sensors may produce different signals based on the same image. A standardized RGB color space, sRGB, is a perceptual color space that allows the unambiguous interchange of digital color images with devices having different color reproduction characteristic profiles. The relationship between the luminance in each RGB color vector to the sRGB value is referred to as the "gamma curve" of the device. A gamma curve, therefore, is the non-linear relationship between RGB and sRGB. Conventional techniques for configuring a digital image capture device include selecting values for a gamma curve by trial and error. A particular value is chosen and used to capture an image which is displayed through a sRGB visual output device. The image is analyzed and adjustments are made to the gamma values. Conventional techniques are limited in that the selection of a gamma curve for a particular digital imaging device often requires time consuming, subjective, iterative processes based on experience.

Accordingly, there is need for an apparatus, system and method for optimization of color space conversion for digital image devices.

DETAILED DESCRIPTION OF THE PREFERRED EMBODIMENTS

In accordance with an exemplary embodiment of the invention, an apparatus, system, and method provide optimization of color space conversion using a joint quality metric representing differences between reference human visual representations and converted device captured image representations in a perceptual uniform color space, where the conversion includes transforming a nonstandard color space (RGB) to a perceptual standard color space (sRGB) and where the joint quality metric includes a color portion, a noise portion, and a contrast portion. An optical sensor produces a digital reference signal when capturing an image of a reference source such as a Macbeth ColorChecker color rendition chart. After white balancing and color correcting the digital reference signal, the gamma curve parameters are determined by minimizing the joint quality metric which is based on differences, within a uniform perceptual color space such as CIELAB, between the gamma curve compensated signal and the standard values for the reference source. The noise portion and contrast portion take into account the noise and the contrast of the gamma curve compensated signal resulting in a gamma curve parameter that is optimized with respect to color, noise, and contrast. The contribution of each portion may be adjusted by weighting each portion in the joint quality metric. The exemplary system, apparatus, and method minimize subjective analysis of a technician determining the optimum gamma curve parameters.

Figure 1:
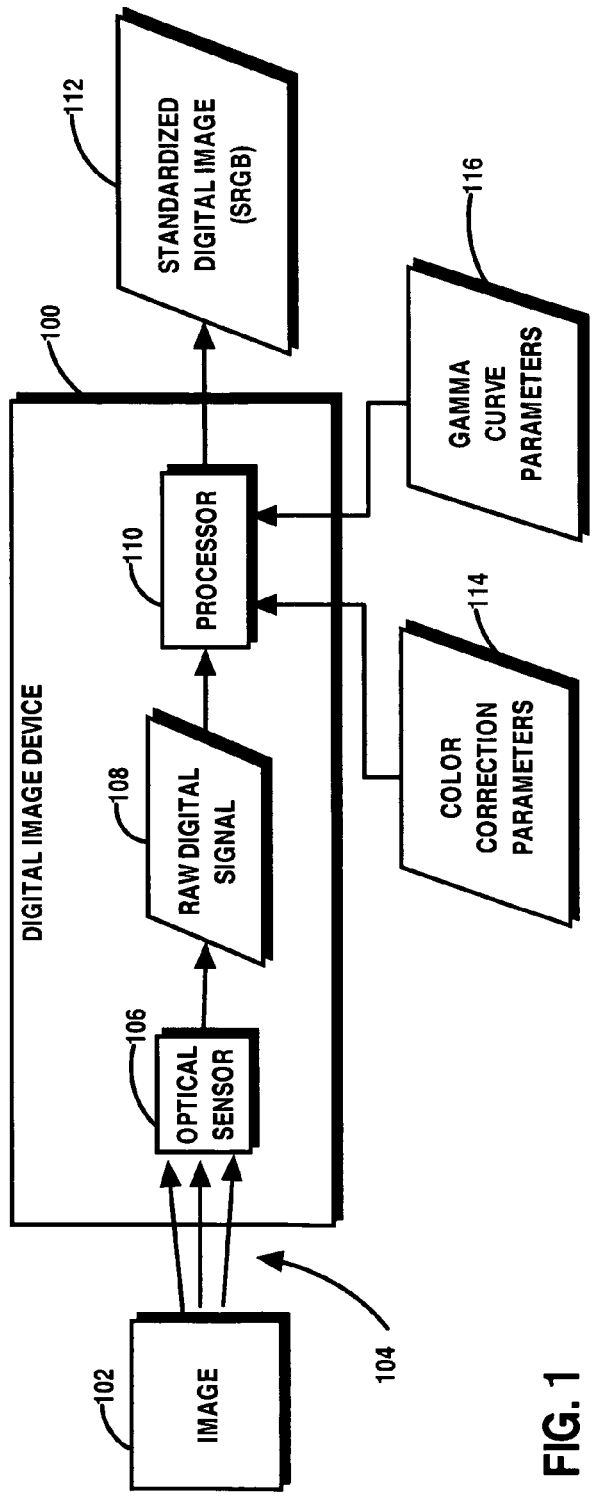
FIG. 1 is a block diagram of a digital image device producing a standardized digital image in accordance with an exemplary embodiment of the invention.

FIG. 1 is a block diagram of a digital image device 100 producing a standardized digital signal 112 in accordance with an exemplary embodiment of the invention. As discussed above, digital image devices 100 are often configured to provide standardized digital image data 112 based on a captured image in order that the perceived image produced by display devices such as monitors, displays, and printers appears similar to the original source image 102. The optical sensor 106 produces a raw digital signal 108 representing the image 102. Light signals 104 received from the image 102 are focused by a lens onto the optical sensor 106 which converts the light signals 104 into a plurality of pixels having a particular color and intensity. The raw digital data comprises the information describing the pixels. A processor 110 evaluates and manipulates the data of the raw digital signal 108 to produce a standardized digital signal 112 representing the image 102. The standardized digital signal 112 is a digital signal within the standard perceptual color space, sRGB. In addition to a white balancing procedure, the processor 110 applies a color correction matrix for color correction and applies a gamma curve to translate the color corrected signal from the nonstandard RGB color space to the sRGB color space. Color correction parameters 114 determine the color correction matrix and one or more gamma curve parameters 116 determine the gamma curve function defining the gamma curve. As discussed below, the color correction parameters 114 and the gamma curve parameters 116 are determined during a sensor optimization procedure.

The digital image device 100 is any camera, cellular telephone, personal digital assistance (PDA), video camera, camcorder, computer or other device having an optical sensor 106 for digitally capturing an image 102. The optical sensor 106 is any device that converts received light signals 104 into digital signals 108 representing the image 102 that produces or reflects the light signals 104. In the exemplary embodiment, the optical sensor 106 is a Charge-Coupled Device (CCD) or Complementary Metal Oxide Semiconductor (CMOS). The processor 110 is any processor, microprocessor, computer, microcomputer, processor arrangement, or application specific integrated circuit (ASIC) suitable for performing the functions described herein. In most circumstances, a processor 110 facilitates the functions and general operations of the digital image device 110 in addition to performing the image processing functions. The processor 110 includes memory in the exemplary embodiment.

Figure 2:
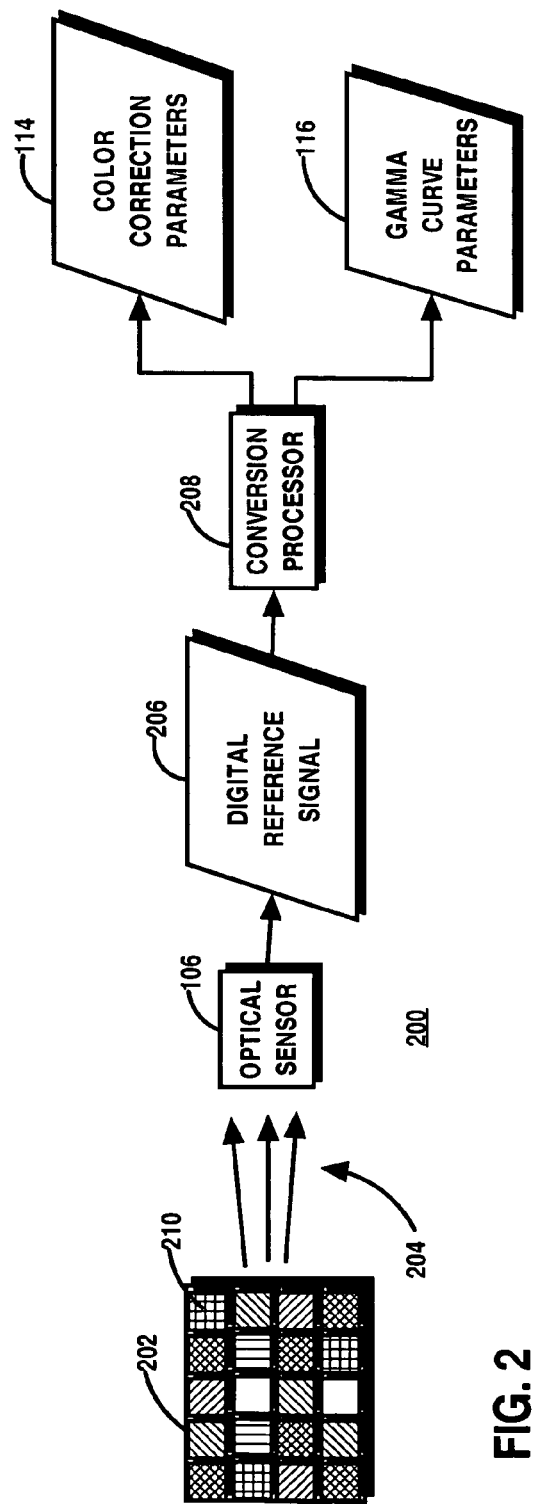
FIG. 2 is a block diagram of sensor optimization system in accordance with an exemplary embodiment of the invention.

FIG. 2 is a block diagram of sensor optimization system 200 in accordance with an exemplary embodiment of the invention. The color correction parameters 114 and the gamma curve parameters 116 are determined by evaluating a digital reference signal 206 produced by the optical sensor 106 when the optical sensor 106 receives light signals 204 from a known reference source 202. The reference source 202 may be any reflective or active light source that emits predictable light signals 204 under controlled conditions such as, for example, a known color checker chart including one or more colored patches 210 having a known reflectance under one or more known illuminants. The reference source 202 is a Macbeth ColorChecker color rendition chart in the exemplary embodiment. Other reference sources 202 may be used in some situations. The optical sensor 106 produces a digital reference signal 206 when the reference source 202 is illuminated with a known illuminant and the reflected light signals 204 are captured by the optical sensor 106. Multiple illuminants may be used to produce multiple digital reference signals to facilitate more balanced reference data.

The conversion processor 208 processes and evaluates the digital reference signal 206 to determine the color correction parameters 114 and the gamma curve parameters 116. In addition to performing a white balancing procedure, the conversion processor 208 color corrects the digital reference signal 206 by applying a color correction matrix determined using a color correction metric. For a particular gamma curve function, a joint quality metric is applied to determine the appropriate gamma curve parameters 116 that result in an optimum conversion from the digital reference signal 206 in a color corrected nonstandard color space such as RGB to a standardized perceptual color space such as sRGB. In the exemplary embodiment, the conversion processor 208 is a computer such as desktop or laptop computer running software code that performs the calculations, evaluations, and functions described herein. The conversion processor 208, however, is any processor, microprocessor, computer, microcomputer, processor arrangement, or application specific integrated circuit (ASIC) suitable for performing the functions described herein. The conversion processor 208 includes memory in the exemplary embodiment.

As explained in further detail below, the conversion processor 208 evaluates the color correction metric which is based on a relationship between the standardized color space and the uniform human perceptual visual color space (CIELAB) after a color correction matrix is applied to the white balanced digital reference signal. The total cost function of the color correction metric is minimized to optimize the color correction and determine to optimum color correction parameters 114. In the exemplary embodiment, the color correction metric includes a color portion and a noise portion where the contribution to the cost function by each portion may be manipulated by weighting the portions. Therefore, applying the appropriate color correction matrix to the white balanced digital reference signal results in a color corrected, white balanced, digital reference signal within a nonstandard RGB color space. By applying this signal to the appropriate gamma curve function, the signal is translated to an industrial standardized reference color space such as sRGB. To determine appropriate gamma curve parameters 116 for the gamma curve function, a gamma curve optimization procedure is performed.

The processor performs the gamma curve optimization to determine the gamma curve parameters 116 by applying a joint quality metric to the white balanced, color corrected, digital reference signal. The joint quality metric is based on a relationship between the RGB color space and the digital reference signal as presented in a uniform perceptual visual color space such as CIELAB when a particular gamma curve is applied to the nonstandard, color corrected and white balanced, RGB signal. The joint quality metric includes a color portion, a noise portion, and a contrast portion. As explained below in further detail, the joint quality metric is minimized for a particular gamma curve function to determine the optimum gamma curve parameters 116. In the exemplary embodiment, the gamma curve function is selected from one of the three gamma curve functions. The gamma curve optimization procedure may be performed for each gamma curve function and the final gamma curve selected based on a subjective analysis of the resulting images. Each gamma curve provides a different combination of tradeoffs resulting in gamma curves that have qualities desirable in different conditions or applications of the digital image device 100.

The color, noise and contrast portions may be weighted to change the contribution of each portion to the total cost function. In the exemplary embodiment the weighting is based at least partially on the particular gamma curve function. Therefore, a set of weighting values may be associated with each type of gamma curve function.

Figure 3:
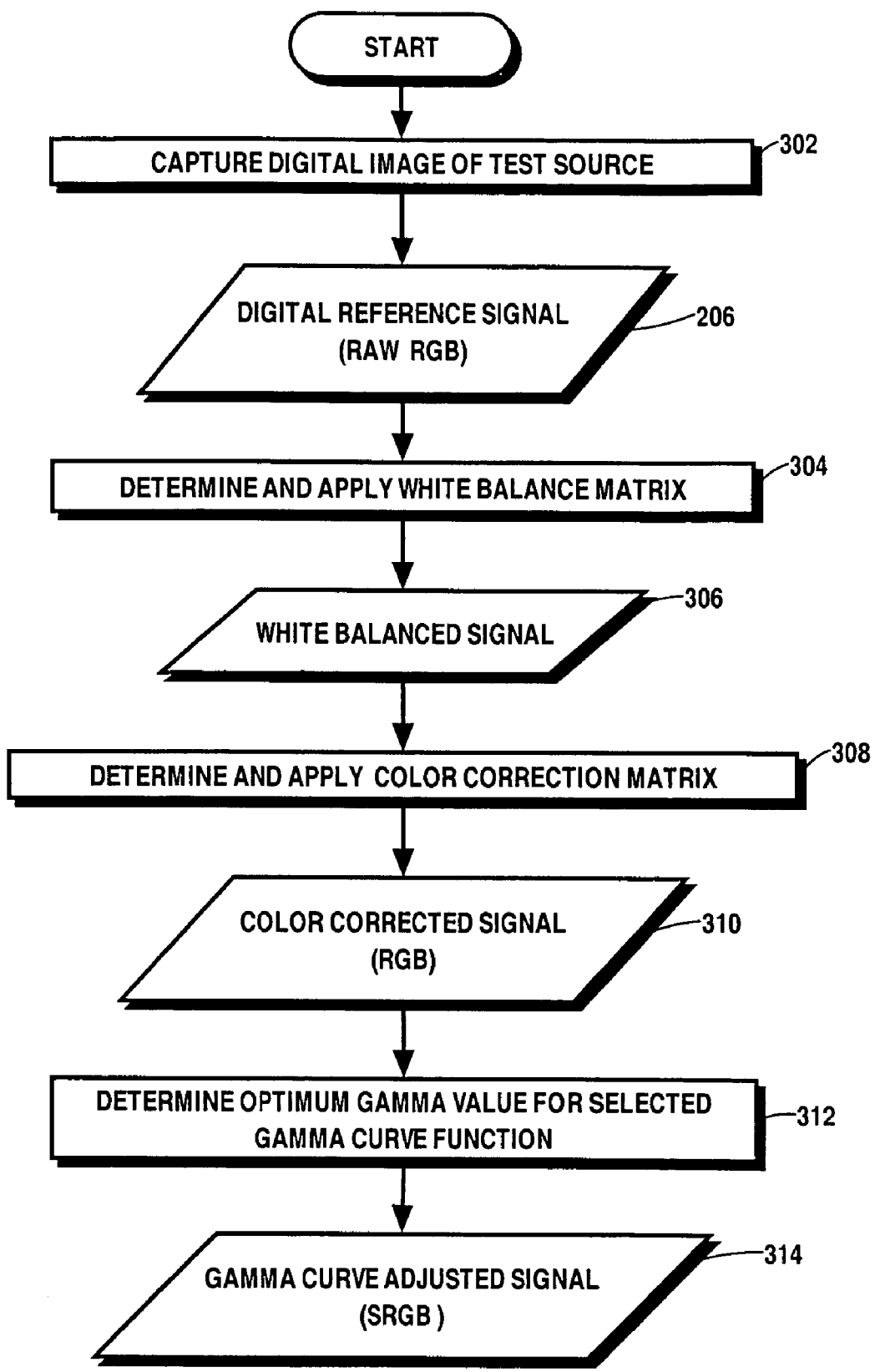
FIG. 3 is a flow chart of a method of determining digital image correction parameters in accordance with an exemplary embodiment of the invention.

FIG. 3 is a flow chart of a method of determining digital image correction parameters in accordance with an exemplary embodiment of the invention. The method may be performed by any combination of hardware, firmware and/or software. In the exemplary embodiment, the method is performed by software code running on a personal computer (PC). A technician exchanges information through a user interface with a software application running on the PC. In some situations, however, the method may be performed by a processor without real time communication with a technician. For example, a processor 110 within a digital image device 100 may perform the functions of the conversion processor 208 using preprogrammed values in some circumstances.

At step 302, a digital reference signal 206 is captured for at least one illuminant. The optical sensor 106 produces the digital reference signal 206 when the optical sensor is exposed to the reference source 202. The digital data corresponding to the digital reference signal 206 is stored in memory of the conversion processor 208. In the exemplary embodiment, the Macbeth Color checker is illuminated with three illuminants including D65, A, and TL84. The digital data for the resulting captured digital reference signal 206 for each illuminant is stored in memory.

At step 304, the white balance compensation matrix is determined and applied to the digital reference signal 206 to produce a white balanced signal 306. In the exemplary embodiment, one or more portions of the digital reference signal 206 that correspond to patches 210 of the reference source 202 that correspond to equal Red, Green, and Blue signals. These gray patches are analyzed to determine the appropriate diagonal white balance matrix that, when applied, will result in equal intensities for the Red, Green, and Blue signals for the gray patches. The patches may be analyzed for different illuminants. The 3×3 white balance diagonal matrix is applied to the digital reference signal 206 to white balance the signal and produce a white balanced signal 306.

At step 308, the color correction matrix is determined and applied to the white balanced signal 306 to produce the color corrected signal 310. A color correction metric is minimized to determine the color correction matrix that, when applied to the white balanced signal 306, results in the color corrected signal 310. In the exemplary embodiment, the color correction metric includes a color portion and a noise portion where the contribution of each portion to the cost function is determined by a color weight ($w_c$) and a noise weight ($w_n$). The color correction metric (CEM) is defined as:

$$CEM = \sqrt{\text{mean}[(w_c \cdot \Delta E)^2] + \text{mean}[(w_n \cdot NM)^2]} = \sqrt{w_c^2 \cdot E[\Delta E^2] + w_n^2 \cdot E[NM^2]} \quad (1)$$

where $w_c$ is the color weight, $w_n$ is the noise weight, $\Delta E$ represents the differences within the perceptual uniform visual color space between the standard color levels and the color levels resulting after a color correction matrix is applied, and where NM (Noise Metric) represents the noise of the color corrected signal.

$\Delta E$ is based on the differences between the standard color in the CIELAB color space and the color of the digital reference signal 206 in the CIELAB color space when illuminated under a particular illuminant. $\Delta E$ is defined as:

$$\Delta E = \sqrt{\Delta L^{*2} + \Delta a^{*2} + \Delta b^{*2}} \quad (2)$$

where $\Delta L^* = L_2^* - L_1^*$, $\Delta a^* = a_2^* - a_1^*$, $\Delta b^* = b_2^* - b_1^*$.

$L_1\_^*$, $a_1\_^*$, $b_1\_^*$, and $L_2\_^*$, $a_2\_^*$, $b_2\_^*$ are the color levels of the digital reference signal 206 and the standard color levels for the reference source 202 as translated to the uniform visual color space (CIELAB), respectively.

The noise metric (NM) is defined similar to the CIE DE94 format:

$$NM = \sqrt{\sigma_{L^*}^2 + \frac{\sigma_{a^*}^2}{w_a^2} + \frac{\sigma_{b^*}^2}{w_b^2}} = \sqrt{\text{trace}\left\{\begin{bmatrix} 1 & & \\ & 1/w_a & \\ & & 1/w_b \end{bmatrix} \begin{bmatrix} \sigma_{L^*}^2 & \sigma_{L^*a^*} & \sigma_{L^*b^*} \\ \sigma_{L^*a^*} & \sigma_{a^*}^2 & \sigma_{a^*b^*} \\ \sigma_{L^*b^*} & \sigma_{a^*b^*} & \sigma_{b^*}^2 \end{bmatrix} \begin{bmatrix} 1 & & \\ & 1/w_a & \\ & & 1/w_b \end{bmatrix}\right\}}$$

$$= \sqrt{\text{trace}\{W_{Lab} \Sigma_{Lab} W_{Lab}\}}, \quad (3)$$

where $w_a$ and $w_b$ were determined empirically through psychophysical experiments, exemplary values include $w_a = \sqrt{40}$ and $w_b = \sqrt{50}$, and $$W_{Lab} = \begin{bmatrix} 1 & & \\ & 1/w_a & \\ & & 1/w_b \end{bmatrix} \quad (4)$$

In the exemplary embodiment, the conversion processor 208 executes an iterative process is perform an equation minimization technique to minimize the total cost function of CEM for three illuminants including D65, A, and TL84. In some situations, individual cost functions may be minimized for each illuminant and the results averaged to determine the values related to the total minimized CEM. Accordingly, the resulting values of the color correction matrix are the color correction parameters 114 in the exemplary embodiment.

At step 312, the optimum gamma values for one or more selected gamma curve functions are determined. A joint quality metric, $Q_jM$, is minimized to determine the optimum value for gamma for the selected gamma curve function. In the exemplary embodiment, joint quality is minimized for three gamma curve functions and the resulting sRGB are displayed through the computer display. The technician selects the preferred gamma curve function based on the displayed images. Any number of gamma curve functions may be evaluated and may be selected by criteria other than the technician's preference. The three exemplary gamma functions provide different compromises between contrast, color, and noise and include:

Q-curve—

$$y = \frac{(1+k)x}{1+kx} \quad (5)$$

Power-function—

$$y = x^k \quad (6)$$

Sigmoid s-curve—

$$\begin{cases} y = a^{1-\gamma} x^\gamma, & 0 \leq x \leq a; \\ y = 1 - (1-a)^{1-\gamma}(1-x)^\gamma, & a < x \leq 1. \end{cases} \quad (7)$$

Any of numerous gamma curve functions can be used.

The joint quality metric includes a color portion, a noise portion, and contrast portion and is defined as:

$$(Q_jM)^2 = w_c^2 \cdot E[\Delta E^2] + w_n^2 \cdot E[(NM)^2] + w_g^2 \cdot E[\nabla E^2] = \quad (8)$$

$$w_c^2 \cdot E[\Delta L^{*2} + \Delta a^{*2} + \Delta b^{*2}] + w_n^2 \cdot E\left[\text{trace}\left\{W_{Lab} \sum_{Lab} W_{Lab}\right\}\right] +$$

$$w_g^2 \cdot E[\Delta C_L^2 + w_a^c \Delta C_a^2 + w_b^c \Delta C_b^2]$$

The performance tradeoff is adjusted by choosing appropriate weights $\{w_c, w_n, w_g\}$ which denote the weighting for color reproduction accuracy, noise metric and local contrast difference respectively. In the exemplary embodiment, the gamma curve is determined by taking the images of standard reference source 202 under multiple illuminants in order to balance the curve for these illuminants. The illuminants are chosen with different characteristics, such as CIE D65, CIE A, and one typical fluorescent illuminant, such as F11, whose simulation, TL84, is widely implemented in a commercial light booth. If multiple illuminants are taken into account, the total cost function is $$T = w_D \cdot (Q_jM)_{D65} + w_A \cdot (Q_jM)_A + w_F \cdot (Q_jM)_F \quad (9)$$

where the illuminant weighting coefficients $\{w_D, w_A, w_F\}$ are chosen to reflect the importance of the illuminant. In some situations, the weighting may be uniform resulting in equal contributions from each illuminant.

In equation (8) above, the color portion of the metric is defined by equation (2), the noise portion is defined by equation (3) and the contrast portion is defined by:

$$C = \sqrt{\Delta C_L^2 + w_a^c \Delta C_a^2 + w_b^c \Delta C_b^2} \quad (10)$$

where the coefficients $w_a^c$, $w_b^c$ are chosen to correspond to the different sensitivities of the human visual system on luminance and chrominance channels. In most situations, the human visual system has a higher contrast sensitivity for luminance channels than for chrominance channels. The contrast difference in the luminance channel in Equation (10) is defined as follows:

$$C_{ref}^L = \frac{L_2 - L_1}{L_2 + L_1}; \quad C_{cam}^L = \frac{L'_2 - L'_1}{L'_2 + L'_1}. \quad (11)$$

$$\Delta C_L = |C_{cam}^L - C_{ref}^L|.$$

In the exemplary embodiment, the conversion processor 208 executes an iterative process is perform an equation minimization technique to minimize the total cost function of the joint quality metric (8). The white balanced and color corrected digital signal is evaluated for different gamma values to determine the gamma value that results in the minimum cost function for the joint quality metric (8) for the gamma curve adjusted signal (sRGB) 314. Accordingly, the gamma curve parameters 116 is the gamma value such k in gamma curve function (5) or (6) or y in gamma curve function (7).

Therefore, in the exemplary embodiment, software code running on a personal computer (PC) enables a technician to optimize the gamma curve for an optical sensor by determining gamma curve parameters 116 using a joint quality metric that takes into account color, noise, and contrast of the resulting digital image after white balancing, color correction and gamma curve adjustment. The digital reference signal captured using a reference source such as the Macbeth color checker chart is white balanced and color corrected to produce a nonstandard RGB signal. The software code performs a minimization of the joint quality metric that includes a color portion, noise portion, and a contrast portion. The color portion is based on the difference between standard colors resulting in the uniform perceptual color space and the colors resulting from the application of a gamma curve to the nonstandard RGB signal. The optimum gamma value is then used in the digital image device 100.

Accordingly, the methods and apparatus of this invention may take the form, at least partially, of program logic or program code (i.e., instructions) embodied in a computer-readable medium, such as floppy diskettes, CD-ROMs, hard drives, random access or read only-memory. When the program code is loaded into and executed by a machine, such as a computer, the machine becomes an apparatus for practicing the invention. When the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method for determining a gamma curve parameter for a gamma curve function for converting a digital signal produced by an optical sensor from a nonstandard color space to a standard color space, the method comprising:
   (a) capturing a digital reference signal with the optical sensor, the digital reference signal being associated with a reference source;
   (b) receiving a standardized signal associated with the reference source;
   (c) deriving a gamma curve compensated signal based on selection of a gamma value and application of a gamma curve function to the digital reference signal;
   (d) evaluating a joint quality metric representative of the quality of the gamma curve compensated signal, the joint quality metric comprising: a color portion, a noise portion, and a contrast portion, wherein the color portion is based on a relationship within a uniform perceptual color space between the gamma curve compensated signal and the standardized signal, wherein the noise portion is based on a noise level of the gamma curve compensated signal, wherein the contrast portion is based on a contrast of the gamma curve compensated signal, and wherein the contrast portion comprises a luminance contrast portion and a chrominance contrast portion;
   (e) iteratively repeating (c) and (d) while varying the gamma value so as to minimize the joint quality metric; and
   (f) selecting the gamma value that minimizes the joint quality metric as the gamma curve parameter.

2. The method of claim 1, wherein the nonstandard color space is a RGB color space and the standard color space is a sRGB color space.

3. The method of claim 1, wherein the uniform perceptual color space is a CIELAB color space.

4. The method of claim 1, further comprising:
   white balancing the digital reference signal to produce a white balanced signal by determining and applying to the digital reference signal a white balance matrix; and
   color correcting the white balanced signal by determining and applying to the white balanced signal a color correction matrix.

5. The method of claim 1, wherein the joint quality metric ($Q_jM$) is defined by:

$$(Q_jM)^2 = \omega_c^2 \cdot E[\Delta E^2] + \omega_n^2 \cdot E[(NM)^2] + \omega_g^2 \cdot E[\nabla E^2] =$$
$$\omega_c^2 \cdot E[\Delta L^{*2} + \Delta a^{*2} + \Delta b^{*2}] + \omega_n^2 \cdot E\left[\text{trace}\left\{W_{Lab}\sum_{Lab} W_{Lab}\right\}\right] +$$
$$\omega_g^2 \cdot E[\Delta C_L^2 + \omega_a^c \Delta C_a^2 + \omega_b^c \Delta C_b^2]$$

where the color portion is defined by $\omega_c^2 \cdot [\Delta L^{*2} + \Delta a^{*2} \Delta b^{*2}]$, the noise portion is defined by $\omega_n^2 \cdot [(NM)^2]$, and the contrast portion is defined by $\omega_g^2 \cdot [\Delta C_L^2 + \omega_a^c \Delta C_a^2 + \omega_b^c \Delta_b^2]$.

6. A method for determining a gamma curve parameter for a gamma curve function for converting a digital signal produced by an optical sensor from a nonstandard color space to a standard color space, the method comprising:

(a) capturing a digital reference signal with the optical sensor, the digital reference signal being associated with a reference source;

(b) receiving a standardized signal associated with the reference source;

(c) deriving a gamma curve compensated signal based on selection of a gamma value and application of a gamma curve function to the digital reference signal;

(d) evaluating a plurality of joint quality metrics representative of the quality of the gamma curve compensated signal under a plurality of different lighting conditions, the plurality of joint quality metrics each comprising: a color portion, a noise portion, and a contrast portion, wherein the color portion is based on a relationship within a uniform perceptual color space between the gamma curve compensated signal and the standardized signal, wherein the noise portion is based on a noise level of the gamma curve compensated signal, and wherein the contrast portion is based on a contrast of the gamma curve compensated signal;

(e) iteratively repeating (c) and (d) while varying the gamma value so as to minimize an overall cost function that is based on each of the plurality of joint quality metrics; and (f) selecting the gamma value that minimizes the overall cost function as the gamma curve parameter.

7. A conversion processor for determining a gamma curve parameter for a gamma curve function for converting a digital signal produced by an optical sensor from a nonstandard color space to a standard color space, the conversion processor configured to:

(a) receive a digital reference signal captured by the optical sensor, the digital reference signal being associated with a reference source;

(b) receive a standardized signal associated with the reference source;

(c) derive a gamma curve compensated signal based on selection of a gamma value and application of a gamma curve function to the digital reference signal;

(d) evaluate a joint quality metric representative of the quality of the gamma curve compensated signal, the joint quality metric comprising: a color portion, a noise portion, and a contrast portion, wherein the color portion is based on a relationship within a uniform perceptual color space between the gamma curve compensated signal and the standardized signal, wherein the noise portion is based on a noise level of the gamma curve compensated signal, wherein the contrast portion is based on a contrast of the gamma curve compensated signal, and wherein the contrast portion comprises a luminance contrast portion and a chrominance contrast portion;

(e) iteratively repeat (c) and (d) while varying the gamma value so as to minimize the joint quality metric; and (f) select the gamma value that minimizes the joint quality metric as the gamma curve parameter.

8. The conversion processor of claim 7, wherein the nonstandard color space is a RGB color space and the standard color space is a sRGB color space.

9. The conversion processor of claim 7, wherein the uniform perceptual color space is a CIELAB color space.

10. The conversion processor of claim 7, the conversion processor further configured to:

white balance the digital reference signal to produce a white balanced signal by determining and applying to the digital reference signal a white balance matrix; and color correct the white balanced signal by determining and applying to the white balanced signal a color correction matrix.

11. The conversion processor of claim 7, wherein the joint quality metric is defined by:

$$(Q_j M)^2 = \omega_c^2 \cdot E[\Delta E^2] + \omega_n^2 \cdot E[(NM)^2] + \omega_g^2 \cdot E[\nabla E^2] =$$

$$\omega_c^2 \cdot E[\Delta L^{*2} + \Delta a^{*2} + \Delta b^{*2}] + \omega_n^2 \cdot E\left[\text{trace}\left\{W_{Lab} \sum_{Lab} W_{Lab}\right\}\right] +$$

$$\omega_g^2 \cdot E[\Delta C_L^2 + \omega_a^c \Delta C_a^2 + \omega_b^c \Delta C_b^2]$$

where the color portion is defined by $\omega_c^2 \cdot [\Delta L^{*2} + \Delta a^{*2} \Delta b^{*2}]$, the noise portion is defined by $\omega_n^2 \cdot [(NM)^2]$, and the contrast portion is defined by $\omega_g^2 \cdot [\Delta C_L^2 + \omega_a^c \Delta C_a^2 + \omega_b \Delta_b^2]$.

12. A conversion processor for determining a gamma curve parameter for a gamma curve function for converting a digital signal produced by an optical sensor from a nonstandard color space to a standard color space, the conversion processor configured to:

(a) receive a digital reference signal captured by the optical sensor, the digital reference signal being associated with a reference source;

(b) receive a standardized signal associated with the reference source;

(c) derive a gamma curve compensated signal based on selection of a gamma value and application of a gamma curve function to the digital reference signal;

(d) evaluate a plurality of joint quality metrics representative of the quality of the gamma curve compensated signal under a plurality of different lighting conditions, the plurality of joint quality metrics each comprising: a color portion, a noise portion, and a contrast portion, wherein the color portion is based on a relationship within a uniform perceptual color space between the gamma curve compensated signal and the standardized signal, wherein the noise portion is based on a noise level of the gamma curve compensated signal, and wherein the contrast portion is based on a contrast of the gamma curve compensated signal;

(e) iteratively (c) and (d) while varying the gamma value so as to minimize an overall cost function that is based on each of the plurality of joint quality metrics; and (f) select the gamma value that minimizes the overall cost function as the gamma curve parameter.

13. A digital image device comprising:

an optical sensor configured to produce, in accordance with an image, a raw digital signal within a nonstandard color space; and a conversion processor that determines a gamma curve parameter for a gamma curve function for converting the raw digital signal produced by the optical sensor from the nonstandard color space to a standard color space, the conversion processor configured to:

(a) receive the raw digital signal from the optical sensor, the raw digital signal being associated with a reference source;

(b) receive a standardized signal associated with the reference source;

(c) derive a gamma curve compensated signal based on selection of a gamma value and application of a gamma curve function to the digital reference signal;

(d) evaluate a joint quality metric representative of the quality of the gamma curve compensated signal, the joint quality metric comprising: a color portion, a noise portion, and a contrast portion, wherein the color portion is based on a relationship within a uniform perceptual color space between the gamma curve compensated signal and the standardized signal, wherein the noise portion is based on a noise level of the gamma curve compensated signal, wherein the contrast portion is based on a contrast of the gamma curve compensated signal, and wherein the contrast portion comprises a luminance contrast portion and a chrominance contrast portion;

(e) iteratively repeat (c) and (d) while varying the gamma value so as to minimize the joint quality metric; and (f) select the gamma value that minimizes the joint quality metric as the gamma curve parameter.

14. The digital image device of claim 13, wherein the nonstandard color space is a RGB color space and the standard color space is a sRGB color space.

15. The digital image device of claim 13, wherein the uniform perceptual color space is a CIELAB color space.

16. The digital image device of claim 13, wherein the gamma curve parameter is further determined by:
white balancing the digital reference signal to produce a white balanced signal by determining and applying to the digital reference signal a white balance matrix; and
color correcting the white balanced signal by determining and applying to the white balanced signal a color correction matrix.

17. The digital image device of claim 13, wherein the joint quality metric is defined by:

$$(Q_jM)^2 = \omega_c^2 \cdot E[\Delta E^2] + \omega_n^2 \cdot E[(NM)^2] + \omega_g^2 \cdot E[\nabla E^2] =$$

$$\omega_c^2 \cdot E[\Delta L^{*2} + \Delta a^{*2} + \Delta b^{*2}] + \omega_n^2 \cdot E\left[\text{trace}\left\{W_{Lab}\sum_{Lab}W_{Lab}\right\}\right] +$$

$$\omega_g^2 \cdot E[\Delta C_L^2 + \omega_a^c \Delta C_a^2 + \omega_b^c \Delta C_b^2]$$

where the color portion is defined by $\omega_c^2 \cdot [\Delta L^{*2} + \Delta a^{*2} \Delta b^{*2}]$, the noise portion is defined by $\omega_n^2 \cdot [(NM)^2]$, and the contrast portion is defined by $\omega_g^2 \cdot [\Delta C_L^2 + \omega_a^c \Delta C_a^2 + \omega_b^c \Delta_b^2]$.

18. A digital image device comprising:
an optical sensor configured to produce, in accordance with an image, a raw digital signal within a nonstandard color space; and
a conversion processor that determines a gamma curve parameter for a gamma curve function for converting the raw digital signal produced by the optical sensor from the nonstandard color space to a standard color space, the conversion processor configured to:
(a) receive raw digital signal, the raw digital signal being associated with a reference source;
(b) receive a standardized signal associated with the reference source;
(c) derive a gamma curve compensated signal based on selection of a gamma value and application of a gamma curve function to the digital reference signal;
(d) evaluate a plurality of joint quality metrics representative of the quality of the gamma curve compensated signal under a plurality of different lighting conditions, the plurality of joint quality metrics each comprising: a color portion, a noise portion, and a contrast portion, wherein the color portion is based on a relationship within a uniform perceptual color space between the gamma curve compensated signal and the standardized signal, wherein the noise portion is based on a noise level of the gamma curve compensated signal, and wherein the contrast portion is based on a contrast of the gamma curve compensated signal;

(e) iteratively repeat (c) and (d) while varying the gamma value so as to minimize an overall cost function that is based on each of the plurality of joint quality metrics; and (f) select the gamma value that minimizes the overall cost function as the gamma curve parameter.

19. A computer-readable medium storing computer-executable instructions configured to determine a gamma curve parameter for a gamma curve function for converting a digital signal produced by an optical sensor from a nonstandard color space to a standard color space, the computer-executable instructions being configured to cause the following computer-executed steps to occur:
(a) receiving a digital reference signal capered by the optical sensor, the digital reference signal being associated with a reference source;
(b) receiving a standardized signal associated with the reference source;
(c) deriving a gamma curve compensated signal based on selection of a gamma value and application of a gamma curve function to the digital reference signal;
(d) evaluating a joint quality metric representative of the quality of the gamma curve compensated signal, the joint quality metric comprising: a color portion, a noise portion, and a contrast portion, wherein the color portion is based on a relationship within a uniform perceptual color space between the gamma curve compensated signal and the standardized signal, wherein the noise portion is based on a noise level of the gamma curve compensated signal, wherein the contrast portion is based on a contrast of the gamma curve compensated signal, and wherein the contrast portion comprises a luminance contrast portion and a chrominance contrast portion;

(e) iteratively repeating (c) and (d) while varying the gamma value so as to minimize the joint quality metric; and (f) selecting the gamma value that minimizes the joint quality metric as the gamma curve parameter.

20. The computer-readable medium of claim 19, wherein the nonstandard color space is a RGB color space and the standard color space is a sRGB color space.

21. The computer-readable medium of claim 19, wherein the uniform perceptual color space is a CIELAB color space.

22. The computer-readable medium of claim 19, further comprising instructions that cause the following computer-executed steps to occur:
white balancing the digital reference signal to produce a white balanced signal by determining and applying to the digital reference signal a white balance matrix; and
color correcting the white balanced signal by determining and applying to the white balanced signal a color correction matrix.

23. The computer-readable medium of claim 19, wherein the joint quality metric is defined by:

$$(Q_jM)^2 = \omega_c^2 \cdot E[\Delta E^2] + \omega_n^2 \cdot E[(NM)^2] + \omega_g^2 \cdot E[\nabla E^2] =$$

-continued $$\omega_c^2 \cdot E[\Delta L^{*2} + \Delta a^{*2} + \Delta b^{*2}] + \omega_n^2 \cdot E\left[\text{trace}\left\{W_{Lab} \sum_{Lab} W_{Lab}\right\}\right] +$$
$$\omega_g^2 \cdot E[\Delta C_L^2 + \omega_a^c \Delta C_a^2 + \omega_b^c \Delta C_b^2]$$

where the color portion is defined by $\omega_c^2 \cdot [\Delta L^{*2} + \Delta a^{*2} \Delta b^{*2}]$, the noise portion is defined by $\omega_n^2 \cdot [(NM)^2]$, and the contrast portion is defined by $\omega_g^2 \cdot [\Delta C_L^2 + \omega_a^c \Delta C_a^2 + \omega_b^c \Delta_b^2]$.

24. A computer-readable medium comprising computer-executable instructions configured to determine a gamma curve parameter for a gamma curve function for converting a digital signal produced by an optical sensor from a nonstandard color space to a standard color space, the computer-executable instructions being configured to cause the following computer-executed steps to occur:
(a) receiving a digital reference signal captured by the optical sensor, the digital reference signal being associated with a reference source;
(b) receiving a standardized signal associated with the reference source;
(c) deriving a gamma curve compensated signal based on selection of a gamma value and application of a gamma curve function to the digital reference signal;
(d) evaluating a plurality of joint quality metrics representative of the quality of the gamma curve compensated signal under a plurality of different lighting conditions, the plurality of joint quality metrics each comprising: a color portion, a noise portion, and a contrast portion, wherein the color portion is based on a relationship within a uniform perceptual color space between the gamma curve compensated signal and the standardized signal, wherein the noise portion is based on a noise level of the gamma curve compensated signal, and wherein the contrast portion is based on a contrast of the gamma curve compensated signal;
(e) iteratively repeating (c) and (d) while varying the gamma value so as to minimize an overall cost function that is based on each of the plurality of joint quality metrics; and
(f) selecting the gamma value that minimizes the overall cost function as the gamma curve parameter.

* * * * *